United States Patent
Agarwal et al.

(10) Patent No.: US 10,572,007 B2
(45) Date of Patent: Feb. 25, 2020

(54) PREVENTING UNINTENDED INPUT

(71) Applicant: International Business Machines Corporation, Armonk, NY (US)

(72) Inventors: Kanak B. Agarwal, Austin, TX (US); Inseok Hwang, Austin, TX (US); Su Liu, Austin, TX (US); Eric Rozner, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/843,284

(22) Filed: Dec. 15, 2017

(65) Prior Publication Data

US 2019/0187786 A1 Jun. 20, 2019

(51) Int. Cl.
G06F 3/01 (2006.01)
G06K 9/00 (2006.01)
G06F 3/0488 (2013.01)
G06K 9/32 (2006.01)

(52) U.S. Cl.
CPC ............ *G06F 3/013* (2013.01); *G06F 3/0488* (2013.01); *G06K 9/0061* (2013.01); *G06K 9/00604* (2013.01); *G06K 9/3233* (2013.01)

(58) Field of Classification Search
CPC ............................ G06K 9/00604; G06F 3/013
See application file for complete search history.

(56) References Cited

U.S. PATENT DOCUMENTS

| | | | |
|---|---|---|---|
| 6,985,137 B2 | 1/2006 | Kaikuranta |
| 7,231,231 B2 | 6/2007 | Kokko et al. |
| 8,539,382 B2 | 9/2013 | Lyon et al. |
| 8,717,199 B2 | 5/2014 | Filson et al. |
| 9,740,005 B2 | 8/2017 | Bean et al. |
| 10,168,812 B1 | 1/2019 | Yates et al. |
| 2003/0034185 A1 | 2/2003 | Kaikuranta |
| 2008/0196945 A1 | 8/2008 | Konstas |
| 2009/0167717 A1 | 7/2009 | Wang et al. |
| 2010/0127995 A1 | 5/2010 | Rigazio et al. |
| 2011/0287754 A1 | 11/2011 | Schlueter |
| 2013/0050133 A1 | 2/2013 | Brakensiek et al. |

(Continued)

FOREIGN PATENT DOCUMENTS

| | | |
|---|---|---|
| CN | 101841786 A | 9/2010 |
| EP | 2077490 A2 | 8/2009 |

(Continued)

OTHER PUBLICATIONS

Abner Matheus "Fingertip Detection in OpenCV" Tango with Code: A blog about frustration and anger, Nov. 15, 2015 (18 pages).

*Primary Examiner* — Muhammad N Edun
(74) *Attorney, Agent, or Firm* — Cantor Colburn LLP; Noah Sharkan (57) ABSTRACT

Examples of techniques for preventing unintended input are disclosed. In one example implementation according to aspects of the present disclosure, a computer-implemented method includes receiving, at a user device, an input. The method further comprises determining, by a processing device, whether a gaze of a user is directed to the user device. The method further comprises, based at least in part on determining that the gaze of the user is directed to the user device, authorizing the input at the user device.

20 Claims, 6 Drawing Sheets

(56) References Cited

U.S. PATENT DOCUMENTS

| | | |
|---|---|---|
| 2013/0145304 A1 | 6/2013 | Deluca et al. |
| 2013/0145404 A1 | 6/2013 | Ohayon et al. |
| 2013/0169560 A1 | 7/2013 | Cederlund et al. |
| 2013/0176264 A1 | 7/2013 | Alameh et al. |
| 2014/0120891 A1 | 5/2014 | Chen et al. |
| 2014/0274159 A1 | 9/2014 | Bernheim Brush et al. |
| 2015/0261318 A1* | 9/2015 | Scavezze .............. G06F 3/0346 345/158 |
| 2017/0032131 A1 | 2/2017 | Dow et al. |
| 2017/0041374 A1 | 2/2017 | Rakshit |
| 2017/0279682 A1 | 9/2017 | Dawson et al. |
| 2018/0088665 A1 | 3/2018 | Peterson et al. |

FOREIGN PATENT DOCUMENTS

| | | |
|---|---|---|
| EP | 3200086 A1 | 2/2017 |
| JP | 2016119019 A | 6/2016 |

* cited by examiner

PREVENTING UNINTENDED INPUT

BACKGROUND

The present invention generally relates to data processing systems, and more specifically, to preventing unintended input.

User devices, such as smartphones, laptops, smart watches, fitness trackers, wearable computing device, and the like have increased in popularity. Internet-of-Things (IOT) and personalization of user devices have created more devices than ever. In fact, a user may regularly use multiple user devices including different types of user devices. For example, a user uses a smartwatch, a fitness tracker, and a smartphone. The user can interact with the user devices in a number of ways, including button inputs, voice inputs, touch screen inputs, and the like. More general purpose user devices, such as a smartphone, can include various sensors (e.g., accelerometer, photovoltaic, proximity, etc.), while more limited purpose user devices, such as a fitness tracker, typically include fewer sensors.

SUMMARY

Embodiments of the present invention are directed to a computer-implemented method for preventing unintended input. A non-limiting example of the computer-implemented method includes receiving, at a user device, an input. The method further comprises determining, by a processing device, whether a gaze of a user is directed to the user device. The method further comprises, based at least in part on determining that the gaze of the user is directed to the user device, authorizing the input at the user device.

Additional embodiments of the present invention are directed to a system for preventing unintended input. A non-limiting example of the system includes a memory comprising computer readable instructions and a processing device for executing the computer readable instructions for performing a method as described herein. Yet additional embodiments of the invention are directed to a computer program product for preventing unintended input, the computer program product comprising a computer readable storage medium having program instructions embodied therewith. The program instructions are executable by a processor to cause the processor to perform a method as described herein.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
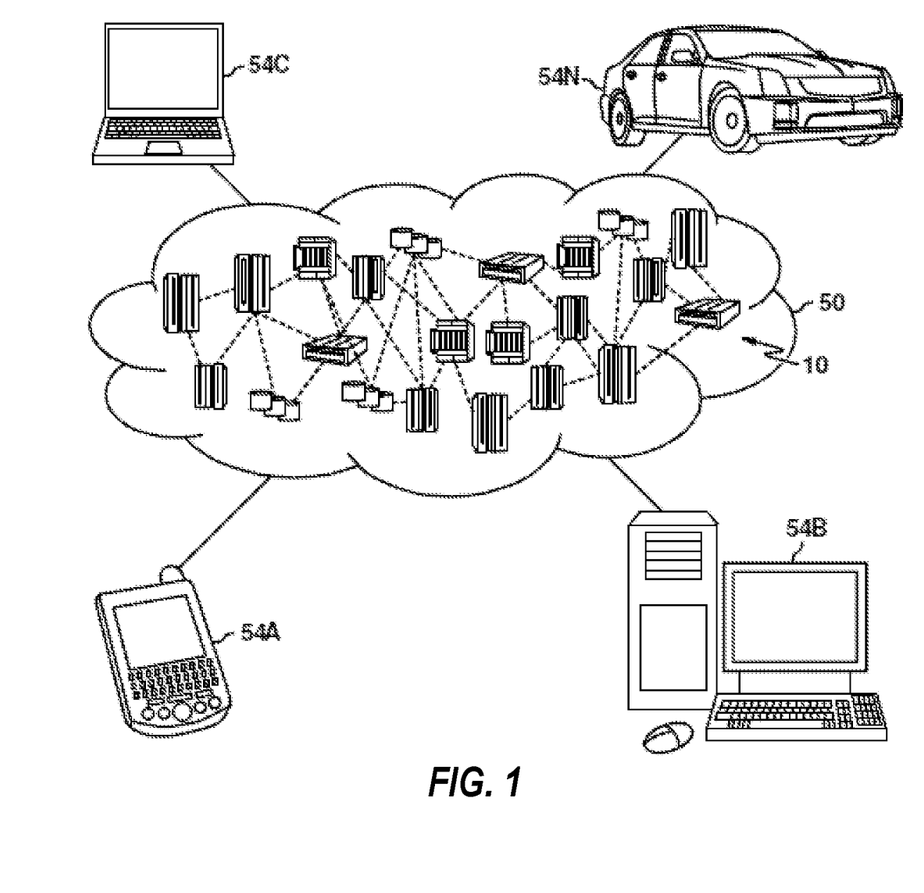
FIG. 1 depicts a cloud computing environment according to aspects of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
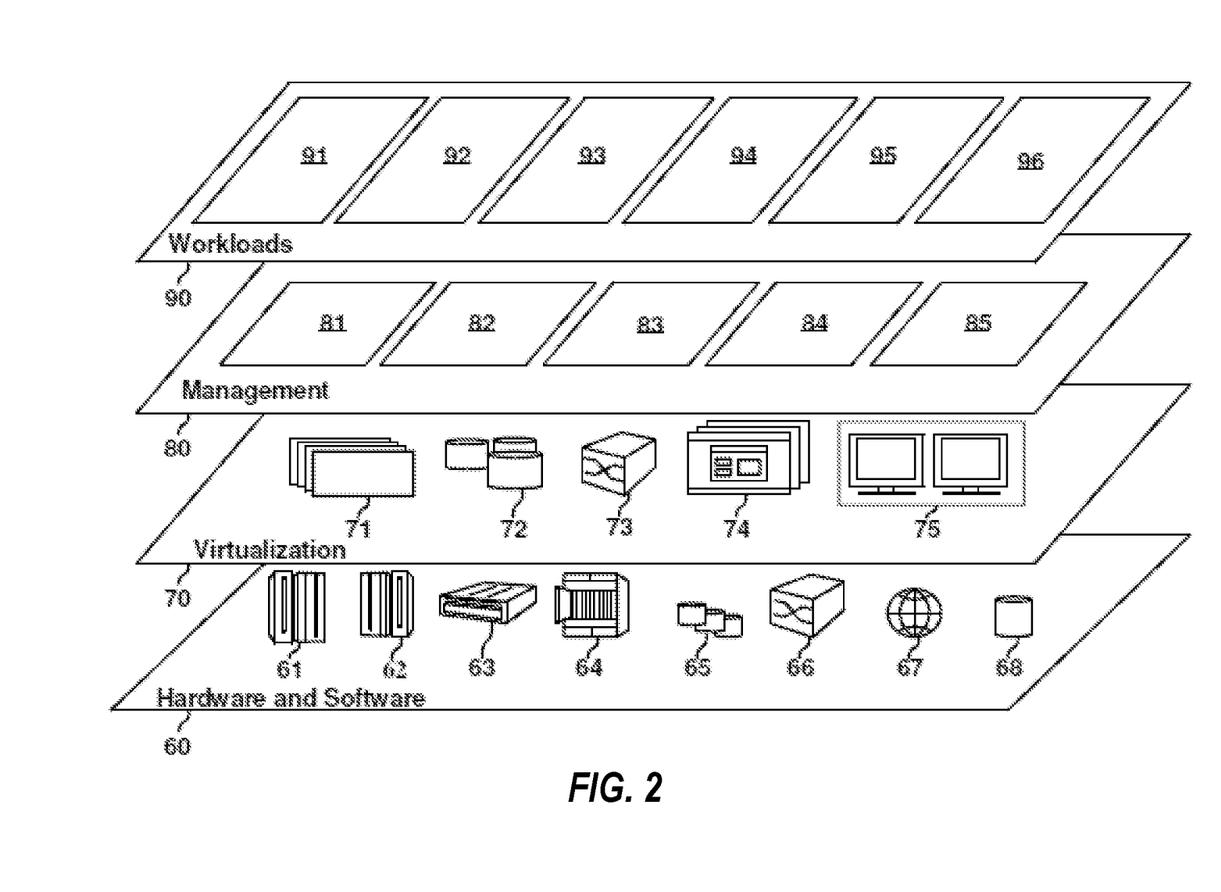
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and preventing unintended input 96.

Figure 3:
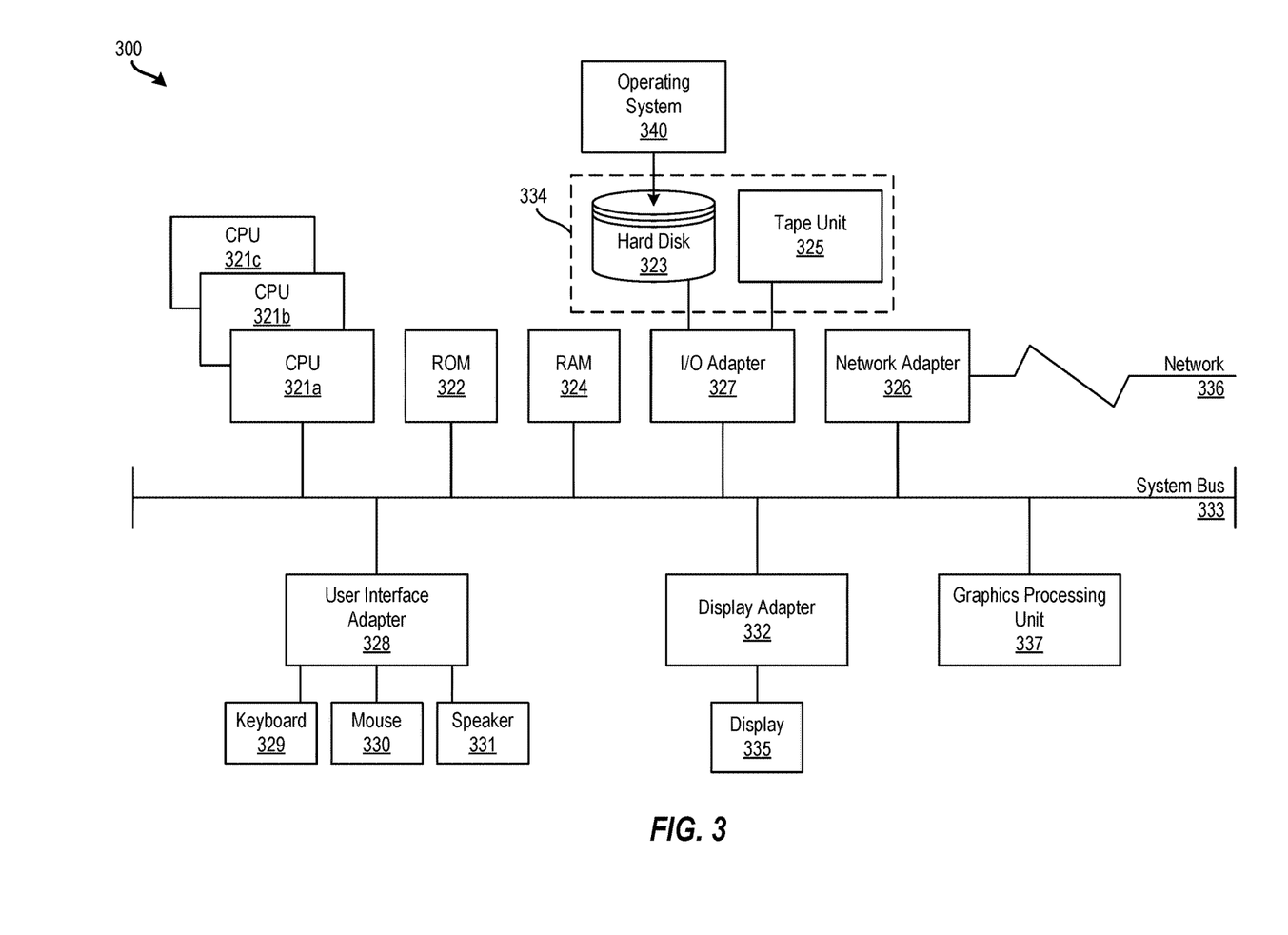
FIG. 3 depicts a block diagram of a processing system for implementing the techniques described herein according to aspects of the present disclosure.

It is understood in advance that the present disclosure is capable of being implemented in conjunction with any other type of computing environment now known or later developed. For example, FIG. 3 illustrates a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further illustrated are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 30, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in the processing system 300.

Turning now to an overview of technologies that are more specifically relevant to aspects of the invention, techniques for preventing unintended inputs are described. User devices with limited sensors can suffer from accidental inputs. For example, a user wearing a smartwatch can cause accidental inputs when the touchscreen of the smartwatch brushes against the user's shirt sleeve. Although the user did not intend this to be an input to the user device, the user device nonetheless treats the input as such. This can cause the smartwatch to perform a task (e.g., place a call, skip to the next song, etc.), which the user did not intend to be performed. Although techniques exist for eliminating accidental inputs, these existing techniques rely on sensors in the user device. For example, existing techniques impose gesture requirements or a touchscreen of the user device, analyze a user's touch patterns or force on a touchscreen of the user device, or rely on additional sensors (e.g., a light sensor, a piezoelectric sensor, an extra touch sensor, a camera in the user device, an accelerometer, etc.) in the user's device to determine whether an input was intentional or accidental. However, special purpose devices, such as a fitness monitor, may not contain the additional sensor or be powerful enough (computationally) to run necessary algorithms for detecting accidental inputs.

The present disclosure addresses the above-described shortcomings of the prior art by providing techniques for preventing unintended input to a user device. To do this, gaze analysis is performed to determine whether the user is looking at the user device before enabling an input to be accepted or executed by the user device. The gaze analysis uses a camera that can be integrated into a device other than the user device to allow the user device to remain simple (i.e., the user device does not need additional sensors to perform the techniques described herein). Based on the gaze of the user, the input can be authorized (when the user is looking at the user device) or denied/ignored (when the user is not looking at the user device). In the latter case, unintended inputs can be avoided.

In some examples, a head-mounted display (HMD), like GOOGLE GLASS or SNAP SPECTACLES, is used to capture the user's gaze and to determine whether the user is looking at the user device. When the user is looking at the device, touch inputs are allowed; however, when the user is not looking at the device, touch inputs are denied or ignored. In some cases, if it is determined that the user is not looking at the user device, the user can provide additional information to the user device to cause the user device to accept the touch input (e.g., enter a user passcode, perform a special input operation (e.g., enter a pattern on a touchscreen of the user device), enter a voice command, etc.). The present techniques work with various user devices, including those both with and without displays. Although the present techniques are described with respect to touch inputs, the present techniques also apply to other inputs, such as voice inputs.

Example embodiments of the disclosure include or yield various technical features, technical effects, and/or improvements to technology. Example embodiments of the disclosure provide techniques for preventing unintended input to a user device by receiving an input at the user device, determining by a processing device (separate from the user device) whether a gaze of a user is directed to the user device, and then authorizing or ignoring the input depending on whether the user's gaze is directed to the user device or not. These aspects of the disclosure constitute technical features that yield the technical effect of preventing unintended inputs, which improve the functioning of the user device. For example, the user device uses less of one or more of its battery resources, memory resources, processing resources, storage resources, and other resources by not accepting and executing unintended inputs (i.e., inputs detected by the user device but not intended to be inputs by the user, such as a sleeve swipe). As a result of these technical features and technical effects, a processing device or system in accordance with example embodiments of the disclosure represents an improvement to existing input detection techniques. It should be appreciated that the above examples of technical features, technical effects, and improvements to technology of example embodiments of the disclosure are merely illustrative and not exhaustive. It should also be appreciated that authentication based on user gaze provides added security to the user device by restricting inputs based on the user's gaze.

Figure 4A:
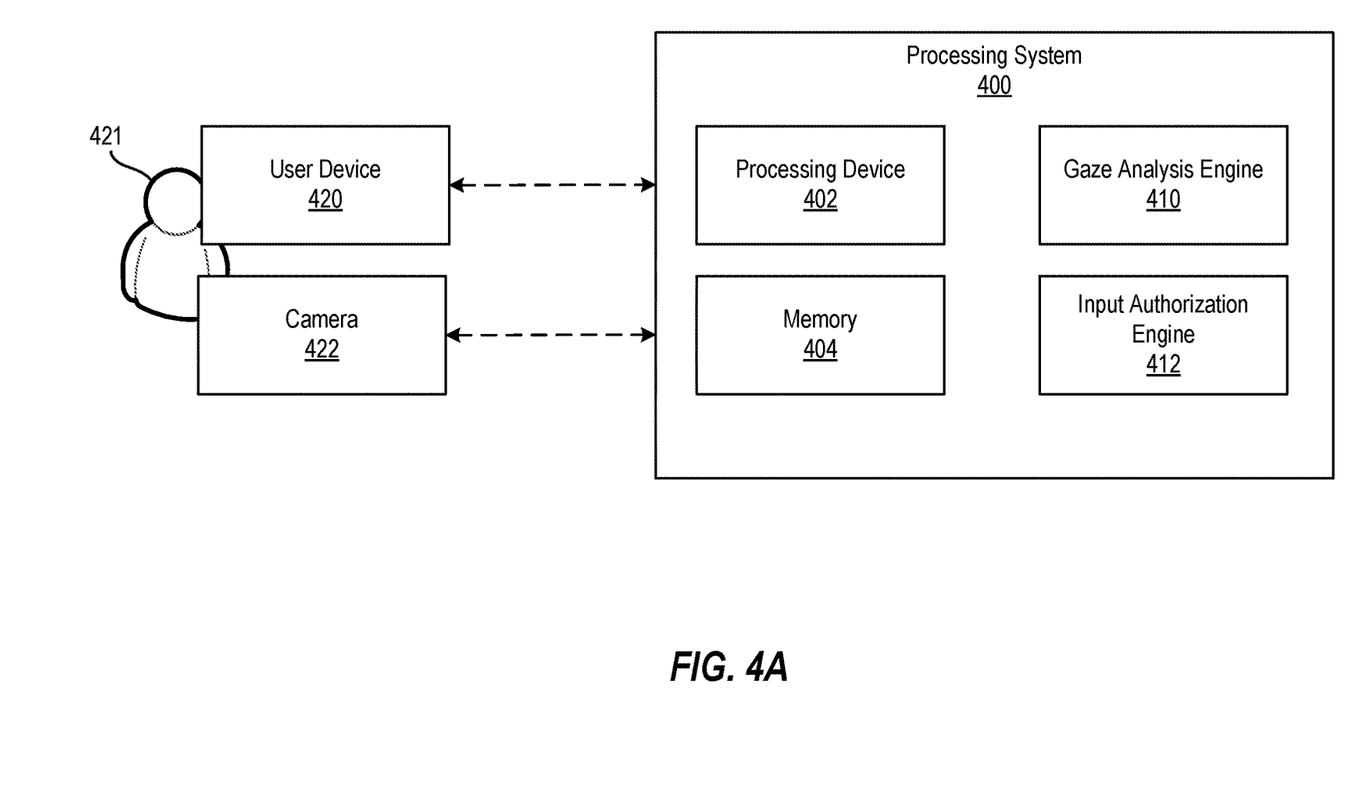
FIG. 4A depicts a block diagram of a processing system for preventing unintended input according to aspects of the present disclosure.
Figure 4B:
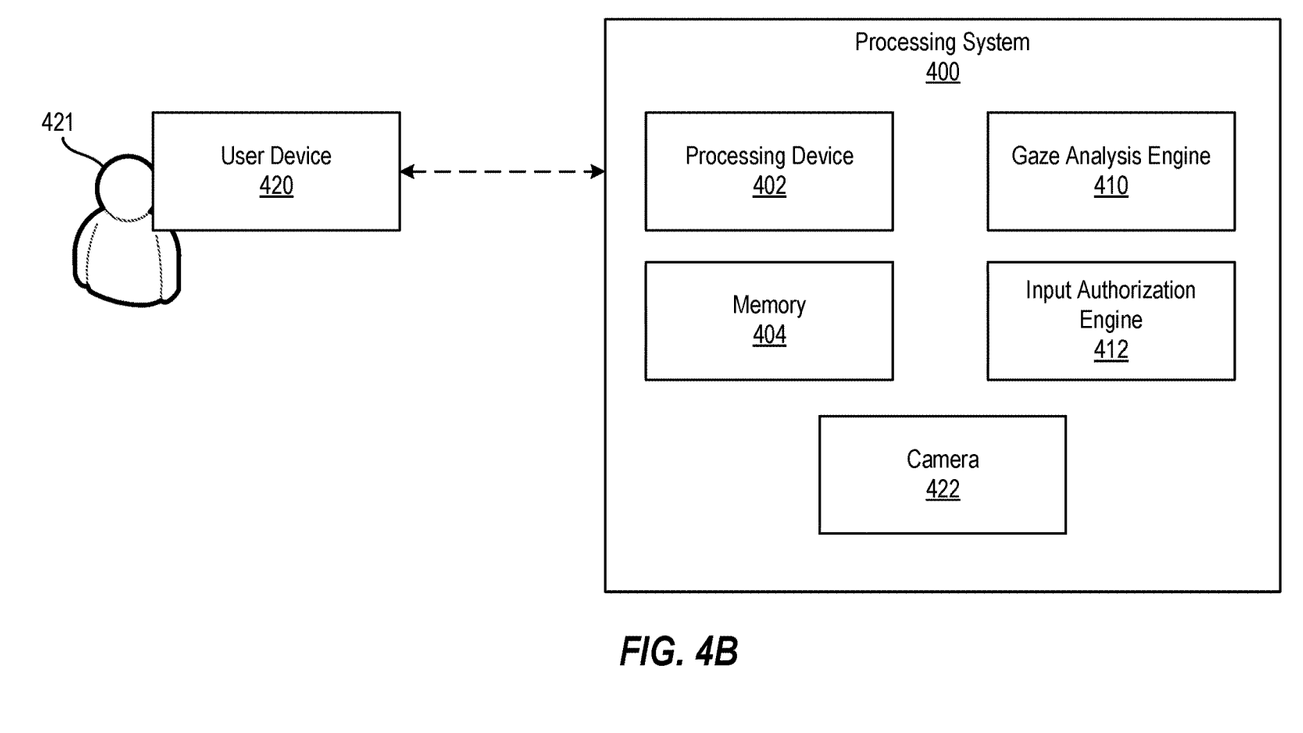
FIG. 4B depicts a block diagram of a processing system for preventing unintended input according to aspects of the present disclosure.

FIGS. 4A and 4B depict a block diagram of a processing system 400 for preventing unintended input according to aspects of the present disclosure. The processing system 400 includes a processing device 402, a memory 404, a gaze analysis engine 410, and an input authorization engine 412. In the example of FIG. 4B, the processing system 400 additionally includes a camera 422.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

In the example of FIG. 4A, the processing system 400 is communicatively connected to a user device 420 and a camera 422 (which, as shown in FIG. 4B, can also be incorporated into the processing system 400), each of which is associated with a user 421. The user device 420 can be, for example, one or more of the following: a smartphone, a laptop, a smartwatch, a fitness tracker, a smart thermostat, a smart washing machine, a wearable computing device, and the like. The camera 422 can be any suitable imaging device configured to capture an image (e.g., a photograph or a video). The camera 422 captures an image or video that depicts the gaze of the user. According to aspects of the present disclosure, the camera 422 can be integrated into an HMD to track the user's gaze. In other examples, the camera 422 can be in proximity to the user 421, such as in the same room as the user, and can track the gaze of the user 421. For example, the camera 422 can be a security camera, a nanny camera, or another suitable camera located in a room or other area in which the user is located.

The gaze analysis engine 410 performs a gaze analysis to determine whether a gaze of the user 421 is directed to the user device 420. That is, the gaze analysis engine 410 determines whether the user 421 is looking at the user device 420. For a user device with no (or minimal) display, the gaze analysis engine 410 uses object recognition to determine whether the user device is in the field of view (i.e., gaze) of the user 421. For example, a standard computer vision technique, such as SURF or YOLO ("You Only Look Once"), can be used to locate objects based on the images captured by the camera 422. The gaze analysis engine 410 can also determine whether the user 421 is physically touching the user device 420 (e.g., a hand or finger of the user 421 is physically touching the user device 420). The gaze analysis engine 410 can utilize known finger detection techniques. When the gaze analysis engine 410 determines that a user's finger, for example, is touching or otherwise using the user device 420 based on the images captured by the camera 422, the gaze analysis engine 410 can indicate to the input authorization engine 412 that inputs should be authorized.

For a user device with a display, the gaze analysis engine 410 can additionally compare display contents of the display of the user device 420 to the images captured by the camera 422. For example, the user device 420 can send data about the screen content (e.g., a foreground application, a histogram of colors on the screen, etc.) to the processing system 400. The gaze analysis engine 410 compares this information with its current view based on the images captured by the camera 422) to determine whether the gaze of the user 421 is directed to the user device 420. When the gaze analysis engine 410 determines that the contents of a display of the user device 420 matches the images captured by the camera 422, the gaze analysis engine 410 can indicate to the input authorization engine 412 that inputs should be authorized.

The input authorization engine 412 authorizes the input at the user device 420 when the gaze analysis engine 410 determines that the input should be authorized. There are two general techniques for authentication: pull-based and push-based. In the case of pull-based authentication, the user device 420 is altered. For example, whenever the user device 420 receives a user interaction (e.g., an input), the user device 420 communicates with the processing system 400 to receive authorization from the input authorization engine 412 based on the gaze analysis performed by the gaze analysis engine 410. In the case of push-based authentication, the processing system 400 broadcasts data packets to all user devices associated with the processing system (e.g., the user device 420). A list of currently allowable actions is maintained for each associated user device. This enables the processing system 400 to perform the gaze analysis and input authorization without the assistance of the user device 420.

In some examples, the authentication is leased for a predefined period of time (e.g., 5 seconds, 20 seconds, 30 seconds, 60 seconds, etc.), which can be defined by the user. This enables the user 421 to continue using the user device 420 after authentication even if the user temporarily redirects his gaze (i.e., looks away briefly). Accordingly, the processing system 400 need not continually perform authentication during this period of time after an initial input is authenticated. According to an example, the lease can continue for the predetermined period based on the authentication of the initial input. That is, for a 30 second period, once the initial input is authenticated, the user device 420 remains authenticated for additional inputs for 30 seconds, at which point a new authentication occurs. According to another example, the lease can be rolling such that the authentication period resets each time an input is received. In this case, for a 30 second time period, the 30 second period restarts after each input is received after the initial input is authenticated.

Figure 5:
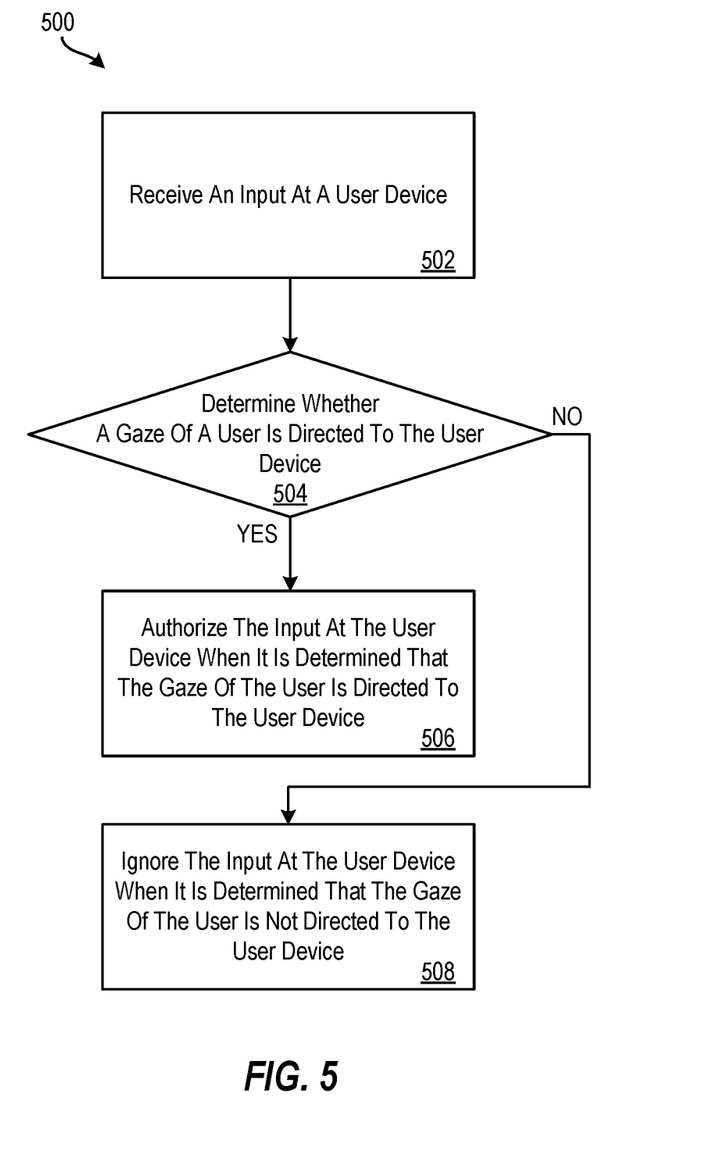
FIG. 5 depicts a flow diagram of a method for preventing unintended input according to aspects of the present disclosure.

FIG. 5 illustrates a flow diagram of a method 500 for preventing unintended input according to examples of the present disclosure. The method 500 can be implemented by any suitable processing device and/or processing system, such as the cloud computing environment 50, the processing system 300, and/or the processing system 400, or any suitable combination thereof.

At block 502, the user device 420 receives an input from the user 421. The input can be a touch input, a voice input, or another suitable type of input.

At decision block 504, the gaze analysis engine 410 (or a processing device) determines whether a gaze of the user 421 is directed to the user device 420. For example, the gaze analysis engine 410 uses object detection to track a hand, finger, etc., of the user 421. In this way, the gaze analysis engine 410 can determine whether the user is purposefully interacting with the user device 420 (as opposed to a non-purposeful or inadvertent input being detected). In another example, the gaze analysis engine 410 can track eye movements of the user 421 to determine whether the gaze of the user is on the user device 420. In yet another example, the gaze analysis engine 410 can receive data about the screen content of the user device 420 and can compare the screen content of the user device 420 to images captured by the camera 422. If a match is detected, it can be determined that the gaze of the user 421 is directed to the user device 420. If no match is detected, the gaze of the user 421 is determined not to be directed to the user device 420.

If it is determined at decision block 504 that the gaze of the user 421 is directed to the user device 420, the input is authorized by the input authorization engine 412 at block 506. As described herein, one or both of push-based and pull-based authentications can be used to authorize the input to the user device 420.

If it is determined at decision block 504 that the gaze of the user 421 is not directed to the user device 420, the input is ignored by input authorization engine 412 at block 508. However, in some examples, the input authorization engine 412 may enable the user 421 to provide additional information (e.g., a passcode) to override the input authorization decision at decision block 504 so that the input can be authorized. This may be useful, for example, if the user 421 is using the user device 420 but temporarily diverts his gaze (e.g., the user is typing a message on the device and looks away briefly while continuing to type).

Additional processes also may be included, and it should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for preventing unintended input, the method comprising:
   receiving, at a user device, a first input;
   determining, by a processing device, whether a gaze of a user is directed to the user device when the first input is received;
   based at least in part on determining that the gaze of the user is directed to the user device when the first input is received, granting authentication for a period of time;
   authorizing the first input at the user device;
   receiving, at the user device, a second input during the period of time;
   authorizing the second input at the user device; and
   responsive to expiration of the period of time, revoking the authentication.

2. The computer-implemented method of claim 1, further comprising, based at least in part on determining that the gaze of the user is not directed to the user device, ignoring the first input at the user device.

3. The computer-implemented method of claim 1, wherein determining whether the gaze of the user is directed to the user device comprises performing a gaze analysis.

4. The computer-implemented method of claim 3, wherein the gaze analysis comprises performing object detection.

5. The computer-implemented method of claim 3, wherein the gaze analysis comprises comparing screen content of the user device with a current view captured by a camera in proximity to the user.

6. The computer-implemented method of claim 1, further comprising capturing an image representative of the gaze of the user, wherein determining whether the gaze of the user is directed to the user device is based at least in part on the captured image.

7. The computer-implemented method of claim 6, wherein the image is captured by a camera in a proximity to the user, wherein the camera is separate from the user device.

8. The computer-implemented method of claim 6, wherein the image is captured by a camera comprised in a head-mounted display (HMD), wherein the HMD is separate from the user device.

9. The computer-implemented method of claim 1, wherein determining whether the gaze of the user is directed to the user device is based at least on tracking at least one eye of the user.

10. The computer-implemented method of claim 1, wherein authorizing the first input comprises a pull-based authentication.

11. The computer-implemented method of claim 1, wherein authorizing the first input comprises a push-based authentication.

12. A system for preventing unintended input, the system comprising:
    a memory comprising computer readable instructions; and
    a processing device for executing the computer readable instructions for performing a method, the method comprising:
        receiving, at a user device, a first input;
        determining, by the processing device, whether a gaze of a user is directed to the user device when the first input is received;
        based at least in part on determining that the gaze of the user is directed to the user device when the first input is received, granting authentication for a period of time;
        authorizing the first input at the user device;
        receiving, at the user device, a second input during the period of time;
        authorizing the second input at the user device; and
        responsive to expiration of the period of time, revoking the authentication.

13. The system of claim 12, wherein the method further comprises, based at least in part on determining that the gaze of the user is not directed to the user device, ignoring the first input at the user device.

14. The system of claim 12, wherein determining whether the gaze of the user is directed to the user device comprises performing a gaze analysis.

15. The system of claim 14, wherein the gaze analysis comprises performing object detection.

16. The system of claim 15, wherein the gaze analysis comprises comparing screen content of the user device with a current view captured by a camera in proximity to the user.

17. The system of claim 12, wherein the method further comprises capturing an image representative of the gaze of the user, wherein determining whether the gaze of the user is directed to the user device is based at least in part on the captured image.

18. The system of claim 17, wherein the image is captured by a camera in a proximity to the user, wherein the camera is separate from the user device.

19. The system of claim 17, wherein the image is captured by a camera comprised in a head-mounted display (HMD), wherein the HMD is separate from the user device.

20. A computer program product for preventing unintended input, the computer program product comprising:
    a non-transitory computer readable storage medium having program instructions embodied therewith, the program instructions executable by a processing device to cause the processing device to perform a method comprising:
        receiving, at a user device, a first input;
        determining, by the processing device, whether a gaze of a user is directed to the user device when the first input is received;
        based at least in part on determining that the gaze of the user is directed to the user device when the first input is received, granting authentication for a period of time;
        authorizing the first input at the user device;
        receiving, at the user device, a second input during the period of time;
        authorizing the second input at the user device; and
        responsive to expiration of the period of time, revoking the authentication.

* * * * *